Figure 1:
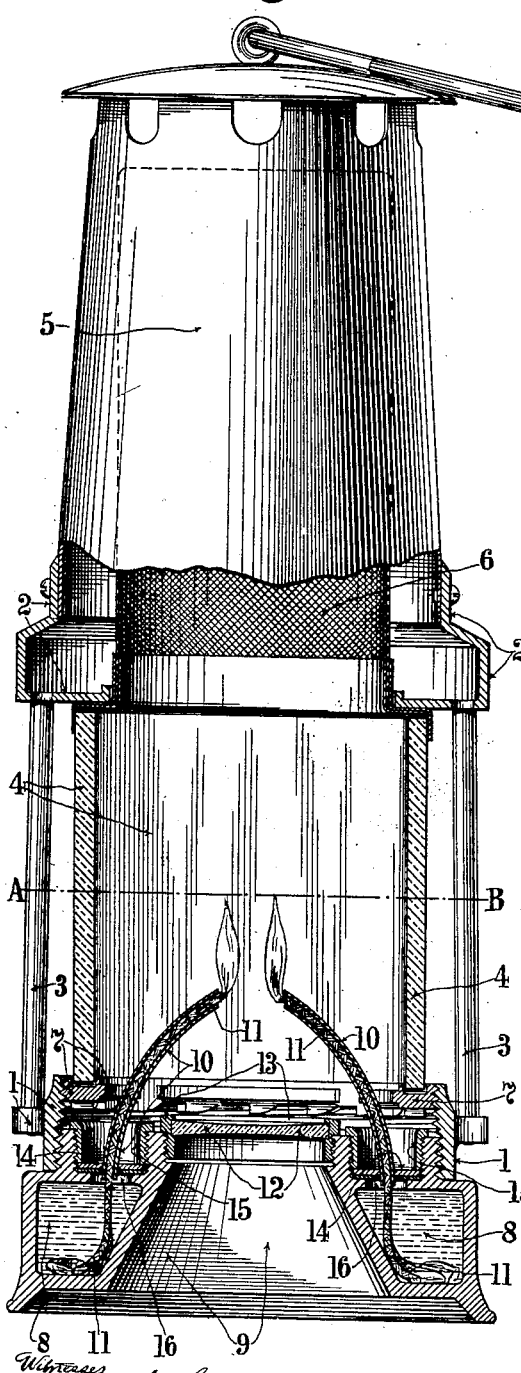

No. 829,757. PATENTED AUG. 28, 1906.
W. BEST.
MINER'S SAFETY AND OTHER INCLOSED PORTABLE LAMP.
APPLICATION FILED JAN. 30, 1906.

Inventor
William Best,
per Harold Serrell
his atty

Witnesses
Chas H Smith

UNITED STATES PATENT OFFICE.

WILLIAM BEST, OF MORLEY, ENGLAND.

MINER'S SAFETY AND OTHER INCLOSED PORTABLE LAMP.

No. 829,757.　　　　Specification of Letters Patent.　　　　Patented Aug. 28, 1906.

Application filed January 30, 1906. Serial No. 298,604.

*To all whom it may concern:*

Be it known that I, WILLIAM BEST, a subject of the King of Great Britain, residing at Morley, in the county of York, England, have invented certain new and useful Improvements in Miners' Safety and other Inclosed Portable Lamps, of which the following is a specification.

Miners' safety lamps are usually constructed with a base portion for holding the oil and wick of the lamp and an upper portion comprising the lamp-frame with the gauze and the bonnet, while the lower and upper portions of the lamp-frame are connected by vertical pillars, which inclose the annular glass through which the light from the flame is thrown radially outward. The light which is thus diffused from lamps of this or somewhat similar construction is in the form of a radial belt, which, although increasing in depth in proportion to its distance from the lamp, leaves the space immediately below and above the lamp in darkness. The obscuring of the ground below the lamp, which is caused by the light from the wick being obstructed by the base portion before referred to, is a great disadvantage, because when the lamp is being carried the ground immediately in front of the bearer is obscured, while for mine work, although the horizontally-thrown light is suitable for working on the face of the coal, yet it is unsuitable for illuminating the ground itself.

Now the object of this invention is to construct a lamp which while throwing out light horizontally around the lamp also throws a portion of the light downward, so as to illuminate the ground below the level of the lamp.

The nature of the invention being described in connection with miners' safety-lamps, the application to other inclosed portable lamps will be obvious.

In carrying this invention into effect the base portion of the lamp is preferably constructed in an annular form, having a conical aperture through the center, the apex of the cone being situated adjacent to the source of light of the lamp. The oil-chamber is formed by the annular lower portion and the conical wall, and the wick-tube or wick-tubes which carry the wick or wicks from the oil-chamber protrude from the upper surface of the base portion, and they may project inward, so as to bring their flame over the central aperture referred to. The conical aperture is closed at the top by means of one or more glasses or lenses, which allow the light of the lamp to pass through the conical aperture to beneath the lamp, and thus extend or concentrate the light in a downward direction to the required degree, while they prevent gas or air from entering the combustion-chamber of the lamp, except by the gauze-protected entrances.

In order that the construction of such a lamp may be readily understood, I will proceed to describe the same with reference to the accompanying drawings, wherein—

Figure 3:
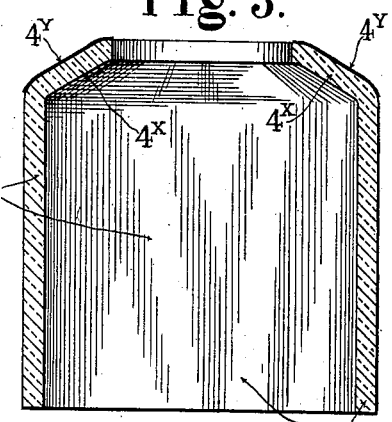
Figure 2:
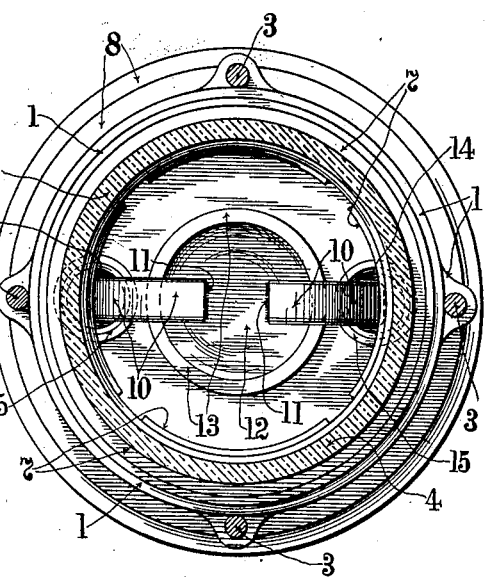

Figure 1 is a vertical section of a miner's safety-lamp constructed in accordance with my invention, and Fig. 2 is a sectional plan taken on the line A B of Fig. 1. Fig. 3 is a detail view.

Referring to Figs. 1 and 2 of the drawings, the lamp-frame comprises lower and upper portions 1 2, connected together by vertical pillars 3, which inclose the annular glass 4. 5 is the bonnet, which is attached to the upper portion 2 of the lamp-frame. 6 is the gauze, arranged within the bonnet 5, and 7 is the following-up ring for carrying and fixing the glass 4 and the gauze 6 in position within the lamp-frame, all of ordinary construction.

According to this invention the base portion of the lamp consists of an oil-chamber 8 of annular form, having a conical aperture 9 through the center, the apex of the cone being situated adjacent to the source of light of the lamp.

10 10 are wick-tubes carrying wicks 11 11 from within the oil-chamber 8, which wick-tubes 10 10 protrude from the upper surface of the oil-chamber 8 and project inward, so as to bring their flame over the central aperture 9 referred to. The aperture 9 is closed at the top by means of a glass or lens 12, carried in a screw-ring 13, screwing into a flange formed in the upper surface of the oil-chamber 8, which glass or lens 12 allows the light of the lamp to pass through the aperture 9 to beneath the lamp, and thus extend or concentrate the light in a downward direction to the required degree, while it prevents gas or air from entering the combustion-chamber of the lamp except by way of the gauze 6. The wick-tubes 10 10 are attached to disks 14 14, which are received in recesses formed in the upper surface of the oil-chamber 8, and the disks 14 14, holding these wick-tubes 10 10, are firmly held down by means of screw-rings 15 15, while the lower ends of the wick-tubes 10 10 are received in apertures 16 16, formed in the bases of the recesses.

It will be seen in employing the above-described construction of lamp that the light is not only thrown out horizontally around the lamp, but also in a downward direction, so as to illuminate the ground beneath the lamp, thus obviating the disadvantages first hereinbefore referred to.

Instead of employing a straight annular glass 4, as shown at Fig. 1, I may employ an annular glass 4, formed with a shoulder $4^x$, as shown at Fig. 3, which shoulder forms a circular reflector for the purpose of receiving light from the flame of the lamp and throwing the same downward through the central aperture 9, so as to assist in illuminating that portion of the ground beneath the lamp, and this reflector can be made by depositing silver on the shoulder $4^x$ itself and protecting it by a metal hood, as shown at $4^y$, or the reflector can be constructed separately and be applied either within or outside the shoulder $4^x$ of the glass 4. The interior surface of the conical aperture 9 in the oil-chamber 8 may be made to reflect light, if desired.

What I claim as my invention, and desire to secure by Letters Patent, is—

1. A miner's safety or other inclosed portable lamp provided with a base portion or oil-chamber of annular or other form having a central conical aperture closed at the top by one or more glasses or lenses, said oil-chamber being provided with one or more wick-tubes protruding and projecting inward so as to bring their flame over the said glasses or lenses which allow the light of the lamp to pass downward through the conical aperture to beneath the lamp, substantially as described.

2. In a miner's safety-lamp, the combination with the lamp-frame, bonnet, gauze, annular glass and following-up ring, of a base portion or oil-chamber of annular form having a central conical aperture closed at the top by a glass or lens, said oil-chamber being provided with two wick-tubes arched radially inward so as to bring their flame over the said glass or lens which allows the light of the lamp to pass downward through the conical aperture to beneath the lamp, substantially as described.

3. In a miner's safety-lamp, the combination with the lamp-frame, bonnet, gauze, annular glass and following-up ring, of a base portion or oil-chamber of annular form having a central conical aperture closed at the top by a glass or lens, said oil-chamber being provided with two wick-tubes arched radially inward so as to bring their flame over the said glass or lens which allows the light of the lamp to pass downward through the conical aperture to beneath the lamp, together with means for assisting the downward illumination through the conical aperture, substantially as described.

In witness whereof I have hereunto set my hand in the presence of two witnesses.

WILLIAM BEST.

Witnesses:
GRIFFITH BREWER,
JOHN JOWETT.